May 18, 1926.
P. V. McLAUGHLIN ET AL
1,585,593
DIRIGIBLE HEADLIGHT
Filed May 19, 1925
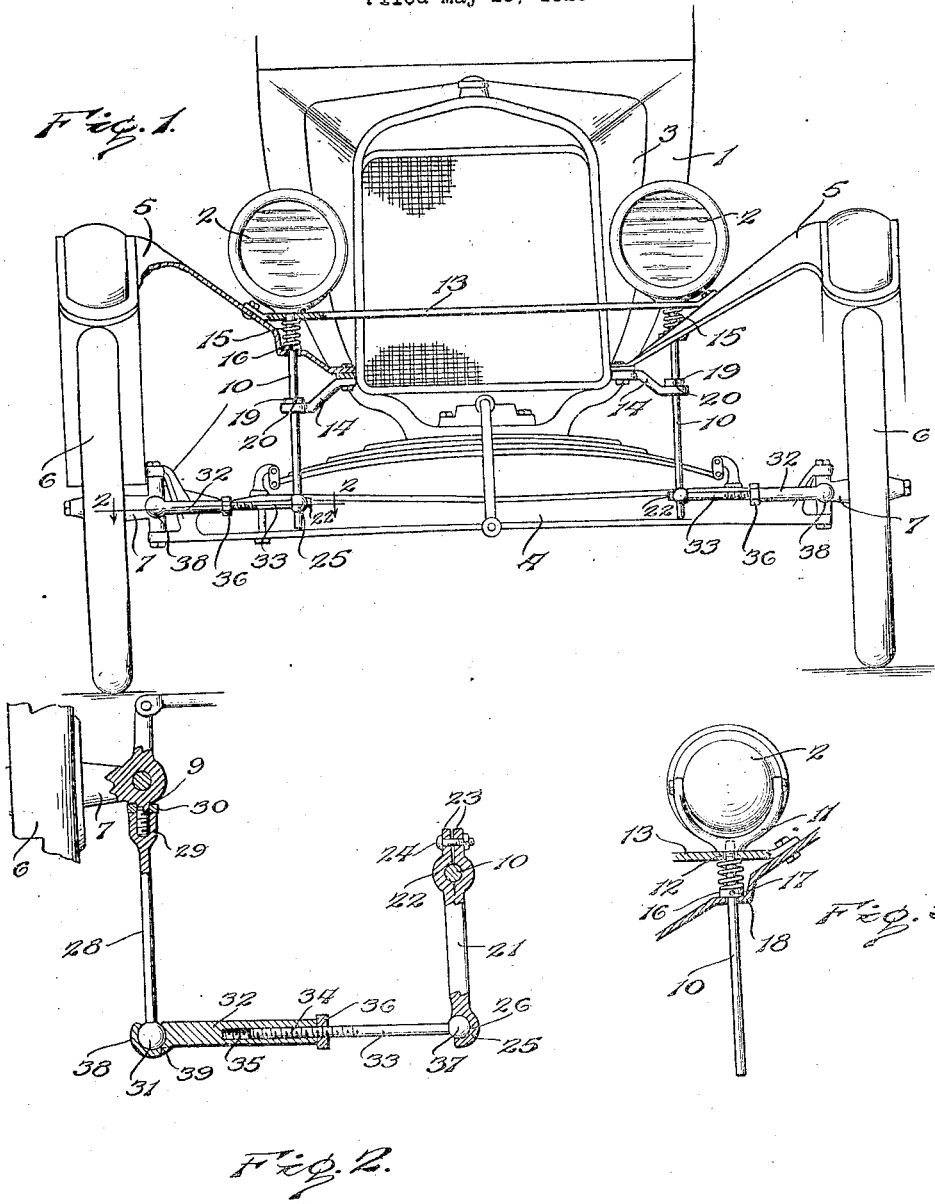
Inventor
P. V. McLaughlin
&
A. R. Stillwell
By Lacy & Lacy, Attorney Patented May 18, 1926.

1,585,593

UNITED STATES PATENT OFFICE.

PERCIVAL V. McLAUGHLIN AND AURELIUS R. STILLWELL, OF SYLVA, NORTH CAROLINA.

DIRIGIBLE HEADLIGHT.

Application filed May 19, 1925. Serial No. 31,408.

This invention relates to headlights for an automobile and one object of the invention is to provide headlights of the dirigible type which may be readily applied to an automobile of a conventional construction and adjusted so that when a turn is made the headlights will be turned.

Another object of the invention is to provide improved actuating means to transmit turning movement to the headlights when the automobile is turned, this actuating means being so constructed that the axle and body portion of the car may have vertical movement relative to each other without the actuating means being broken.

Another object of the invention is to so construct the actuating means that a rod forming part of the same may be adjustably connected with a steering arm extending from the wheel carrying spindle of the front axle of the automobile and to provide an improved type of link for connecting the rod with an arm adjustably carried by the pivot post of a lamp.
This invention is illustrated in the accompanying drawing, wherein Figure 1 is a view showing an automobile in front elevation with the improved lamps applied thereto, a mud guard at one side of the automobile being broken away to show the manner of mounting the lamps;

Fig. 2 is an enlarged sectional view taken on the line 2—2 of Fig. 1, and

Fig. 3 is a fragmentary view showing the manner of mounting the lamps.

The automobile 1 to which the lamps 2 are applied is of a conventional construction and includes an engine hood 3, a front axle 4 and mud guards 5 which extend over the front wheels 6 carried by the usual spindles 7. The spindles 7 are pivotally connected with the ends of the front axles 4 in the usual manner and each is provided with a forwardly extending arm 9 which is threaded, as shown in Fig. 2.

The lamps and the actuating means to impart turning movement to the lamps are of a duplicate construction and, therefore, only one will be described in detail. Each lamp is provided with a depending post 10 which extends downwardly from the forks 11 and passes through an opening 12 formed in the brace bar 13. The brace bar 13 is the usual brace bar which is secured to the mud guards 5 and extends between them in front of the radiator, as shown in Fig. 1. It will, therefore, be seen that the brace bar 13 not only serves as a brace for the mud guards but also serves as an upper guide for the post 10. Lower guides 14 are secured to the chassis bars at opposite sides of the motor hood and extend beneath the mud guards and terminate in eyes which slidably receive the posts 10. A spring 15 is disposed about each post 10 beneath the bar 13 and has its lower end in engagement with a washer or collar 16 securely held in a set position upon the post by the set screw 17 and adapted to seat in a cup 18 formed in the mud guard. Each post also carries a lower collar 19 which is in the form of a washer and is held in a set position upon the post by a set screw 20. The washers 19 are disposed above the lower guides 14 and the washers 16 and 19 are so disposed upon the posts that, when the washers 16 are seated in the cups 18, as shown in Fig. 3, the washers 19 will be seated upon the guides 14, as shown in Fig. 1.

In order to cause the lamps to turn when the front axles 6 are turned to steer the automobile, there has been provided an actuating mechanism shown in detail in Fig. 2. Referring to this figure, it will be seen that each post 10 carries an arm 21 which extends forwardly from the lower end portion of the post. In order to connect the arm with the post, its rear end portion is split longitudinally and formed into clamping jaws 22 which extend about the post and terminate in fingers 23 through which is passed a fastener bolt 24. By this arrangement of parts the arm may be vertically and angularly adjusted upon the post when the lamp is disposed to throw its light directly ahead and the bolt then tightened to securely hold the arm in the set position. The outer free end of the arm terminates in a head 25 having a ball-receiving socket 26 formed therein and opening through the side of the head. A rod 28 which has one end portion provided with a threaded socket, as shown at 29, is screwed onto the threaded arm 9 of the spindle arm 8 and is locked in place by means of an ordinary lock nut 30. By providing the type of connection specified, the rod may be screwed onto the arm the necessary amount to position the spherical head 31 at its outer end in alinement with the socket 26 of the arm 21 and the nut 30 then tightened to securely hold the rod in the adjusted position. The arm 21 and rod 28 are connected at their outer forward ends by a link which is in the nature of a turnbuckle. The turnbuckle as usual includes end portions 32 and 33, the end portion 33 being in the form of a rod having a threaded end portion 34 which is screwed into a threaded socket 35 formed in the end portion 32 and secured in an adjusted position by means of lock nuts 36. At its outer end the rod or member 33 terminates in a spherical head 37 which is received in the pocket 26. The outer end of the section 32 terminates in a head 38 having a ball-receiving socket 39 provided therein and opening through its rear side to receive the spherical head 31 at the outer end of the rod 28. It will, therefore, be seen that the turnbuckle is connected with the rod and arm for universal movement, thereby permitting the axle and the body portion of the automobile to have vertical movement relative to each other without danger of the rod, arm or turnbuckle being bent or broken.

When the lamps are applied to an automobile, the posts are passed downwardly through the openings which will be formed in the brace rod 13 and the springs 15 and washers 16 then placed upon the post. The post will then be again moved downwardly and passed through the washers 19 and through the eyes at the outer ends of the brackets 14 which will be secured to the chassis bars and will extend downwardly in front of the front axle. The washers will be properly adjusted upon the post and secured by their set screws so that the springs will be placed under the proper tension. The rods 28 will now be screwed into engagement with the arms 8 of the steering spindles and the arms 21 secured upon the lower end portions of the post. The arms will be disposed at the proper distance from the lower ends of the posts to properly position them with respect to the rods 28 and the rods 28 adjusted to extend forwardly the proper amount to dispose the turnbuckle or links substantially parallel to the axle. After the proper adjustment has been made to dispose the turnbuckles parallel to the axle and the rods and arms parallel to each other, the lock nuts 30 and bolts 24 will be tightened. The turnbuckles will, of course, be adjusted to properly position the arms parallel to the rods before the bolts 24 are tightened and the lock nuts 36 tightened to secure the turnbuckles in the set position. The lamps are now ready for use and will ordinarily throw their light directly ahead of the car in proper focus. When a turn is to be made, the front wheels are turned in the usual manner and when they turn the lamp operating means will be actuated to rotate the post and turn the lamps in the direction in which the turn is to be made. In going over rough roads, the lamps will not be vibrated out of place or the parts forming the operating mechanism bent or broken on account of the universal joints and springs 15 being provided. There has, therefore, been provided an arrangement of dirigible headlights which will be very efficient in operation and can be very easily applied to an automobile of a conventional construction.

Having thus described the invention, we claim:

1. In a structure of the character described, an upper guide adapted to be secured to the mud guards of an automobile and extend between the mud guards, said guide provided with openings near its ends, lower guides adapted to be mounted beneath the mud guards and provided with eyes for alinement with the openings of said upper guide, lamps, depending pivot posts carried by said lamps adapted to pass through the guides and mud guards and mount the lamps for turning movement, collars carried by the upper portions of said posts, springs between said collars and upper guides to normally retain the collars in engagement with the mud guards and yieldably resist upward movement of said posts and lamps, other collars carried by said posts to engage said lower guides and limit downward movement of said posts, arms extending from the lower end portions of said posts, rods adapted to be connected with the steering arms of wheel carrying spindles, and links extending between said arms and rods and connected therewith for universal movement.

2. In a structure of the character described, an upper guide adapted to be secured at its ends to the mud guards of an automobile and extend between the mud guards, said guide provided with openings near its ends, lower guides adapted to be mounted beneath the mud guards and provided with eyes for alinement with the openings of said upper guide, lamps, depending pivot posts carried by said lamps adapted to pass through the guides and mud guards and mount the lamps for turning movement, collars carried by the upper portions of said posts, springs between said collars and upper guides to normally retain the collars in engagement with the mud guards and yieldably resist upward movement of said posts and lamps, other collars carried by said posts to engage said lower guides and limit downward movement of said posts, arms clamped to the lower end portions of said posts for longitudinal and angular adjustment thereon and extending forwardly therefrom, ball-receiving sockets at the forward ends of said arms and open at their sides, rods each having one end adapted for threaded connection with the forward portion of the steering arm of a pivoted wheel spindle, said rods extending forwardly when in place and at their forward ends having spherical heads, and longitudinally adjustable links extending between the forward ends of said rods and arms and each having at one end a socket loosely receiving a rod head and at its other end a spherical head loosely received in the socket at the forward end of one of said arms.

3. In combination with a vehicle including a mud guard formed with an opening, and a pivotally mounted wheel carrying spindle, an upper guide having a portion extending above the perforated portion of said mud guard in spaced relation thereto and formed with an opening alined with the opening of the mud guard, a lower guide extending beneath the mud guard and formed with an opening, a lamp, a depending pivot post for said lamp extending through the openings of the mud guard and guides to mount the lamp for turning, upper and lower collars carried by said post and resting one upon said lower guide and the other upon said mud guard, a spring between said upper guide and last-mentioned collar to yieldably resist upward movement of said post and lamp, an arm extending from the lower end portion of said post, a rod secured to said spindle for swinging therewith, and a link extending between said arm and rod and connected therewith for universal movement.

4. In combination with a vehicle including a mud guard formed with an opening, and a pivotally mounted wheel carrying spindle, a guide having a portion extending above the perforated portion of said mud guard in spaced relation thereto and formed with an opening alined with the opening of the mud guard, a lamp having a depending pivot post extending through the openings of said guide and mud guard to mount the lamp for turning movement, a collar carried by said post and resting upon said mud guard, a spring between said collar and guide to yieldably resist upward movement of said post and lamp, and means for transmitting turning movement to said post from said spindle.

In testimony whereof we affix our signatures.

PERCIVAL V. McLAUGHLIN. [L. S.]
AURELIUS R. STILLWELL. [L. S.]